Figure 1:
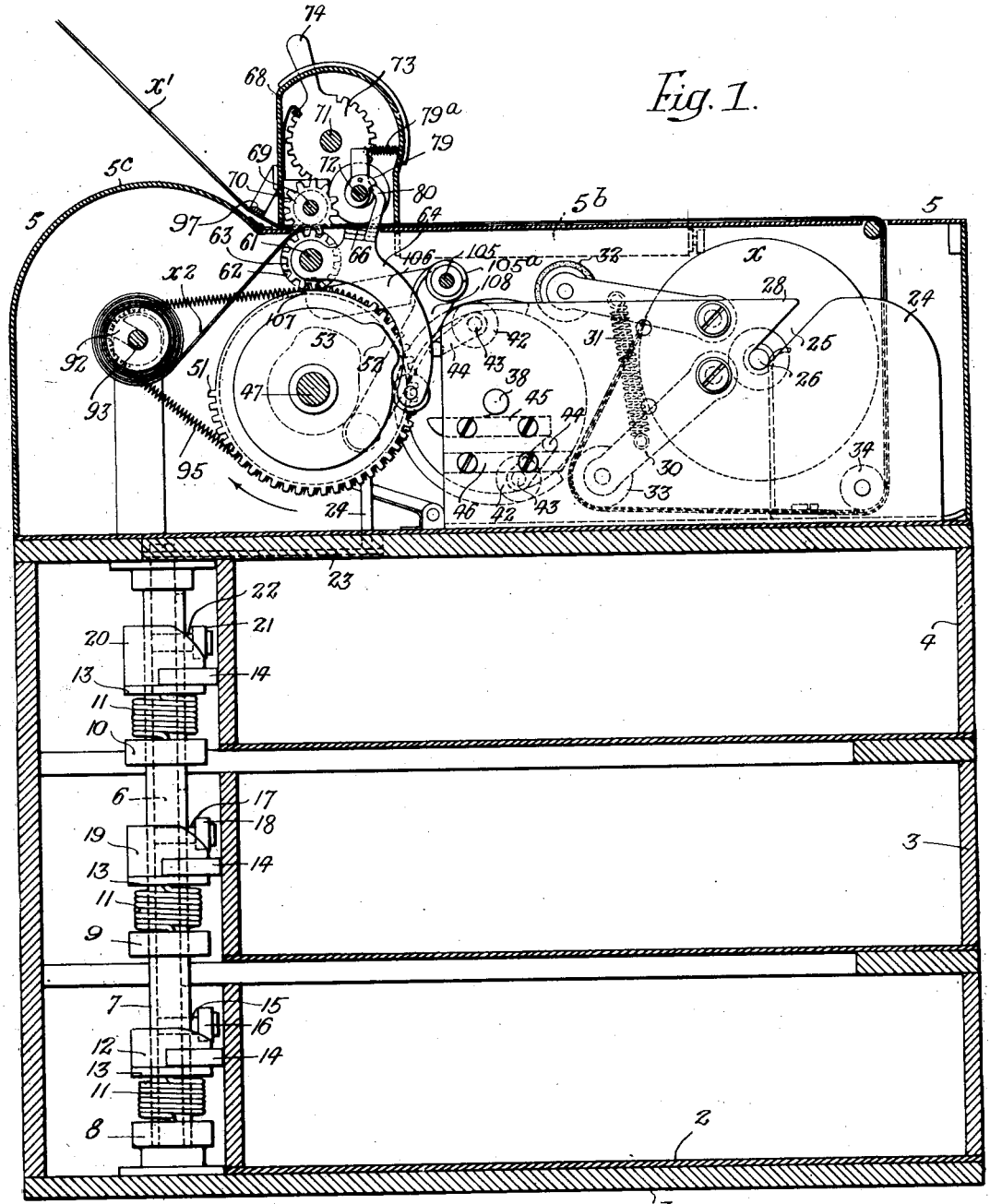

S. B. TILY & J. G. & M. O. REHFUSS.
CASH REGISTER.
APPLICATION FILED MAY 23, 1911.

1,095,044.

Patented Apr. 28, 1914.
3 SHEETS—SHEET 1.

Inventors.—
Stephen B. Tily.
John G. Rehfuss.
Martin O. Rehfuss.
by their Attorneys.
Howson & Howson Witnesses.—

S. B. TILY & J. G. & M. O. REHFUSS.
CASH REGISTER.
APPLICATION FILED MAY 23, 1911.

1,095,044.

Patented Apr. 28, 1914.
3 SHEETS—SHEET 2.

Witnesses
Inventors— Stephen B. Tily, John G. Rehfuss, Martin O. Rehfuss,
by their Attorneys—
Howson & Howson S. B. TILY & J. G. & M. O. REHFUSS.
CASH REGISTER.
APPLICATION FILED MAY 23, 1911.
1,095,044.
Patented Apr. 28, 1914.
3 SHEETS—SHEET 3.
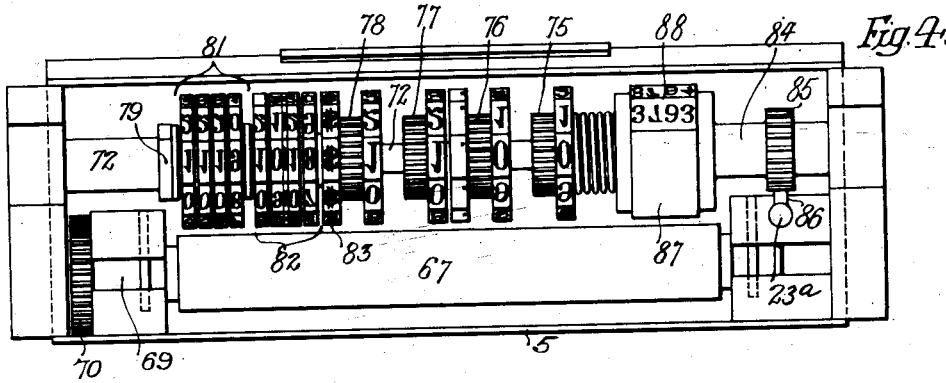
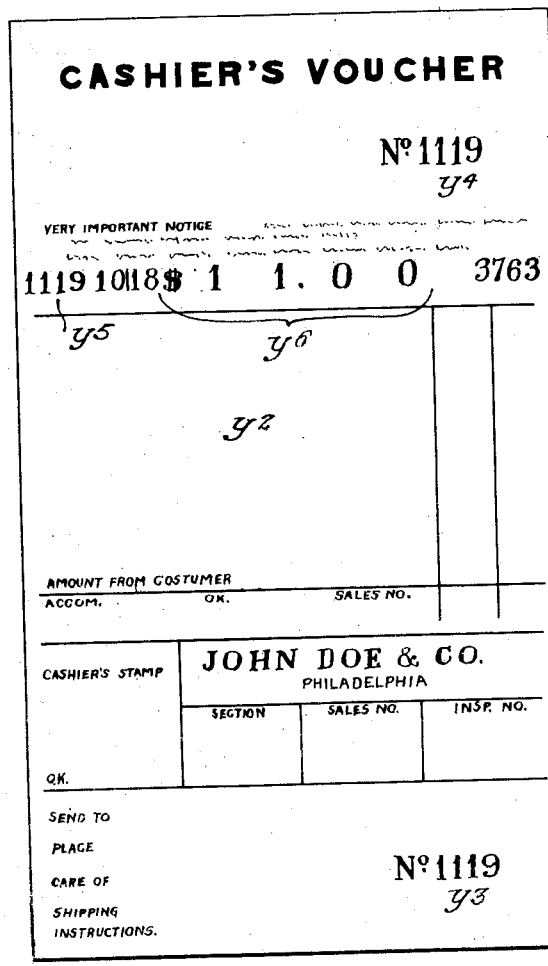
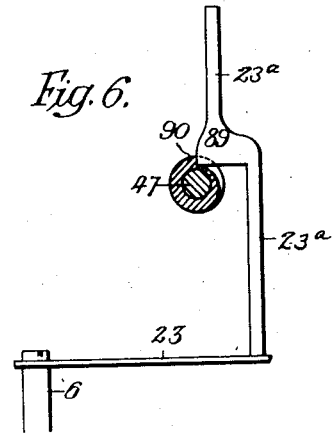
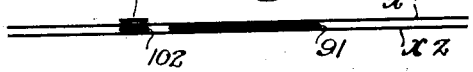
Inventors.—
Stephen B. Tily.
John G. Rehfuss.
Martin O. Rehfuss.
by their Attorneys
Howson & Howson
Witnesses.—

UNITED STATES PATENT OFFICE.

STEPHEN B. TILY, JOHN G. REHFUSS, AND MARTIN O. REHFUSS, OF PHILADELPHIA, PENNSYLVANIA, ASSIGNORS TO JOHN WANAMAKER, OF PHILADELPHIA, PENNSYLVANIA, A CORPORATION OF PENNSYLVANIA.

CASH-REGISTER.

1,095,044.	Specification of Letters Patent.	Patented Apr. 28, 1914.

Application filed May 23, 1911. Serial No. 628,954.

*To all whom it may concern:*

Be it known that we, STEPHEN B. TILY, JOHN G. REHFUSS, and MARTIN O. REHFUSS, citizens of the United States, and residents of Philadelphia, Pennsylvania, respectively, have invented certain Improvements in Cash-Registers, of which the following is a specification.

One object of our invention is to provide a cash register for use in department stores and particularly of the type described and claimed in an application for U. S. patent filed by us on January 29, 1910, Serial No. 541,153, which shall include means for automatically printing on a web of paper certain predetermined matter to provide a schedule immediately prior to the time at which a previously printed schedule is filled out by the salesperson.

We further desire to provide a cash register which shall include means for printing on a web of blank paper a schedule having spaces for certain matter to be written thereon by a salesperson, and which shall also include certain manually adjustable printing mechanism whereby certain records such as the date, amount of the sale, number of the salesperson and other matter, may likewise be applied to the schedule which has been previously printed by the machine; the invention also contemplating the provision of operating means common to both sets of printing mechanism whereby the schedules as printed are numbered consecutively each in two places.

We also desire that the record printing mechanism shall include means for consecutively numbering the schedules at the time the record is made thereon; the arrangement of parts being such that the schedules themselves are printed by a rotary printing device while the records are made by a reciprocating printing mechanism.

We further desire to provide a form of cash register in which, after certain autographic matter has been placed upon a printed schedule forming part of a continuous web of paper, operation of certain levers will set up type corresponding to the amount of the sale, etc., and in which the subsequent operation of a hand lever will not only cause a printed record of the amount of the sale, etc., to be made upon the schedule, but will also cause appropriate mechanism to print a blank schedule on the web of paper preparatory to delivering it to a portion of the machine in which it may be used to receive subsequent autographic as well as the printed records.

These objects and other advantageous ends we secure as hereinafter set forth, reference being had to the accompanying drawings, in which:—

Figure 2:
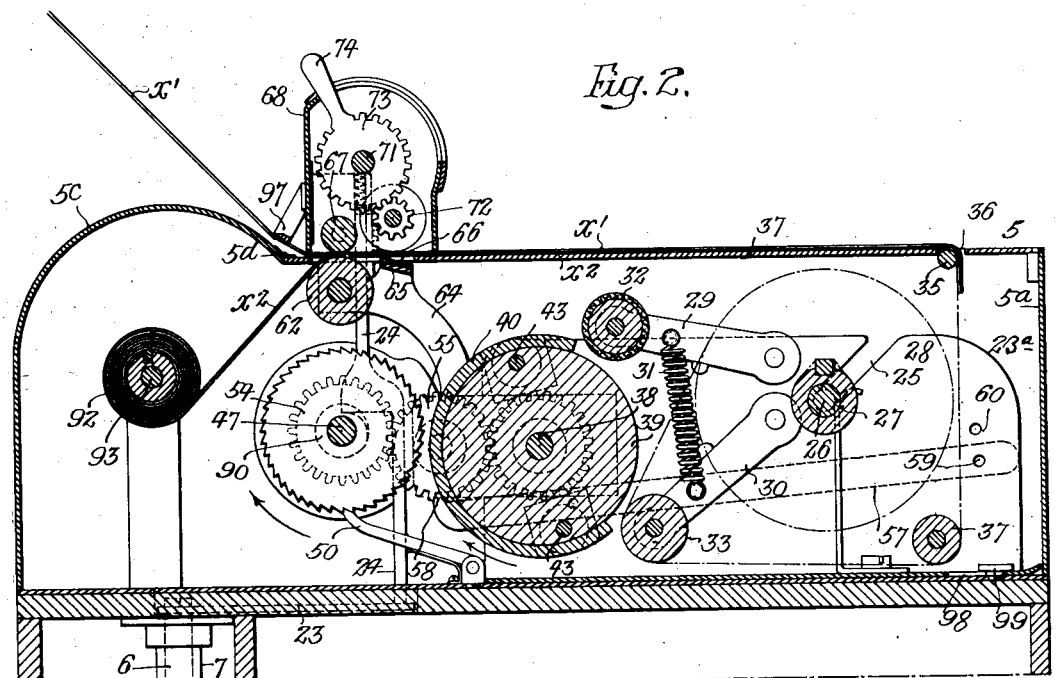
Figure 3:
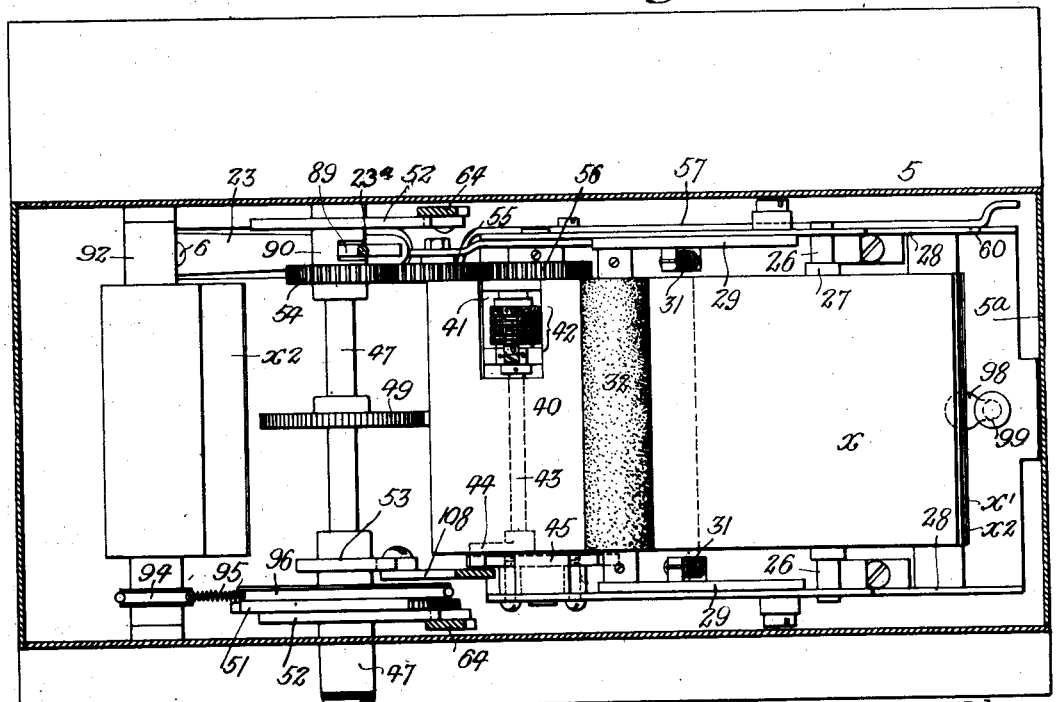

Figure 1, is a longitudinal vertical section of a cash register illustrating the various parts constituting our invention; Fig. 2, is a vertical section of the upper portion of the register shown in Fig. 1, taken on a plane passing through the carriage which supports the blank paper roll and the schedule printing and numbering mechanism; Fig. 3, is a plan, partly in section, illustrating certain features of the interior construction of our cash register; Fig. 4, is an inverted plan of the record printing mechanism and the parts associated therewith; Fig. 5, is a plan of one of the schedules printed by the machine; Fig. 6, is an elevation, partly in section, illustrating one of the details of the device, and Fig. 7, is a diagrammatic section showing the relative positioning of the paper webs and the ink ribbons.

In the above drawings, 1 is the box-like base of our machine in which are slidably mounted three cash drawers 2, 3 and 4 and which carries at its upper portion a metallic casing 5 containing or supporting the printing and other mechanism constituting our invention.

In a suitable space at the rear of the drawers is mounted a vertically movable spindle indicated in dotted lines at 6 and guided in a tubular structure 7. This latter has fixed to it collars 8, 9, and 10 and has around it three springs 11. The lowermost of these springs has one end connected to the collar 8 and the other end connected to a cam 12 fixed to an arm 13 carrying a roller 14; the whole being so assembled that the spring continuously acts through the arm and roller to tend to open the drawer 2.

The tubular structure 7 is slotted immediately adjacent the cam 12 to permit of the passage of a pin 15 fixed to the spindle 6 and carrying a roller 16 operative on the upper edge of the cam 12, so that as this latter turns under the action of its spring, as when the drawer is opened, said roller and pin and with them the spindle 6 are vertically raised. Similarly there is an arm 13 on the roller 14 operative under the action of the second spring 11 upon the drawer 3; there being in this case a second pin 17 having a roller 18 and mounted on the spindle 6 so as to be actuated by a second cam 19 connected to the arm 13. The drawer 4 is likewise acted on by a roller 14 and an arm 13 connected to the second end of a spring 11 whose opposite end is connected to the collar 10, there being in this instance a cam 20 connected to the arm 13 in such position as to operate on the roller 21 carried by a pin 22 fixed to the spindle 6.

It is noted that the various cams 12, 19 and 20 are of such construction that each of them will cause vertical movement of the spindle 6 to an extent different from that caused by the others; the movement of this spindle being transmitted through a bar indicated in dotted lines at 23 to a vertically movable rod 23ª shown in detail in Figs. 2 and 6. Within the casing 5 is mounted a removable frame or carriage 24 consisting of a bottom and two side members 28. These latter members are slotted at 25 for the reception of a removable spindle 26 carrying a core 27 on which is wound a double web of blank paper indicated at X. On each of the side members 28 are pivoted two arms 29 and 30 and each two of these arms on the same side of the carriage are normally drawn toward each other by a spring 31. The arms 29 carry between their outer extremities an inking roller 32, while the arms 30 serve to support a roller 33 serving both as a platen or abutment for certain printing mechanism hereinafter noted and also as a guide for the paper webs leading from the paper supply roll X.

Between the front portions of the side members 28 of the carriage is mounted a second guide roll 34, while a third guide roll 35 is carried by the side parts of the casing 5 immediately adjacent a slot 36 through which the two paper webs extend prior to their passage over a flat portion 37 of the said casing 5. In the rear portion of the carriage 24 is journaled a spindle 38 on which is mounted a roll 39 having on its cylindrical surface a curved plate 40 on which is formed certain type matter which it is desired to print upon one of the paper webs to form a blank schedule; there being, however, in this curved plate or shell two openings, of which one is indicated at 41 in Fig. 3, through each of which projects the type from a number of type wheels 42, designed to consecutively number the schedules as they are printed. These various type wheels are so arranged on a supporting spindle 43 that but one numeral or symbol of each of them normally lies flush with the printing surfaces of the type or printing matter constituting the active portions of the shell 40. These two sets of numbering devices are placed at points 180° from each other and each has on its operating spindle 43 a crank 44 whose end projects at one end of the roller 39. In order that these cranks may be oscillated and the numbering type wheels intermittently actuated under operating conditions, we provide on the inner face of the side member 28 of the carriage a pair of actuating cams 45 and 46 consisting of two substantially parallel metallic strips spaced apart so as to receive between them the crank handle or pin as indicated in dotted lines in Fig. 1. The arrangement is such that as the roller 39 is turned each of the pins of the cranks successively strikes the lower of the cam strips 46 and is moved thereby nearer to the shaft 38 until it passes beyond a vertical plane through the center of said shaft. Thereafter this crank pin and with it the crank is pushed back to its original position by engagement with the cam strip 45, so that each of the spindles 43 is in turn given an oscillation sufficiently great to actuate its numbering type wheels in the well known manner. These are, of course, provided with the necessary pawl and ratchet mechanism well known in the art and not illustrated in detail in this case.

The main driving shaft 47 of the cash register extends within and between the side members of the casing 5, being provided at one end with an operating crank handle 48. On said shaft is mounted a ratchet wheel 49 which is engaged by a spring actuated pawl 50 mounted on the bottom of the casing 5 so that it is possible to turn the shaft 47 in but a single direction. The shaft also has fixed to it an interrupted gear 51, a pair of platen actuating cams 52, a cam 53 for locking the printing mechanism and a gear wheel 54. This latter gear wheel normally meshes with a gear 55 journaled on a short spindle carried by the adjacent side member 28 of the carriage and in turn meshing with a third gear 56 fixed to the spindle 38.

When the carriage 24 is withdrawn from the casing 5, the gear 55 is moved out of mesh with the gear 54 and in order that the printing mechanism on said carriage may not change its position relatively to the mechanism in the casing 6 owing to its disengagement from the gear, we preferably mount on the carriage an elongated lever 57 carrying at one end a tooth 58 which when desired may be moved into engagement with the teeth of the gear 55 so as to lock the same. The opposite end of the lever is provided with a pin 59 which enters a hole in the side member 28 of the carriage when the tooth of the lever is engaged with the gear so as to retain it in such engagement, and there is a second hole 60 placed to receive the pin 59 when the lever has been moved to such a position that this tooth 58 disengages said gear.

Within the casing 5 above the shaft 47 is a second shaft 61 having a nip roll 62 and also having fixed to it a pinion 63 so placed as to be capable of engagement by the teeth of the interrupted gear 51. This pinion is locked from turning under certain conditions by means of a lever fulcrumed on a pin or shaft 105 and having an arm 106 formed with a tooth engaging said pinion under the action of a spring $105^a$. A second arm 108 of the lever carries a roller so placed as to be acted on by the cam 53. Fulcrumed on the shaft 61 as a pivot are two arms 64, each carrying at its lower extremity a roller operative upon one of the cams 52 and rigidly connected together by means of a cross bar 65 on which is mounted a platen 66, the arrangement being such that when the high parts of the cams strike the rollers on the arms 64, the platen 66 is moved upwardly so as to press against a series of printing and numbering wheels any material which may lie between itself and them. A second nip roll 67 is mounted within a casing 68 preferably on top and hinged to one side of the main casing 5 so as to be capable of being swung over to expose its open under face at will. Said nip roll is carried on a spindle 69 having fixed to it a pinion 70 meshing with the pinion 63 and there are also journaled in this top casing two other shafts or spindles 71 and 72. The first of these loosely carries a series of gear wheels of which one is shown at 73 in Fig. 2 and each of these wheels has an upwardly projecting operating arm 74 whereby it may be turned on said spindle.

The spindle 72 has loosely carried on it a series of pinions 75, 76, 77 and 78 to which are respectively fixed a series of number-carrying wheels (Fig. 4) and which respectively mesh with the gears 73. In addition the spindle 72 has fixed to it a ratchet tooth 79 so mounted as to be capable of engagement by a pawl 80 projecting from one of the platen-carrying arms 64; the arrangement being such that the upward operative movement of the platen is accompanied by a similar movement of the pawl 80 which is thus caused to engage the tooth 79 to give a partial revolution to one of a series of numbering wheels 81 constituting a counter similar to that formed by the numbering wheels 42 on the roll 39. In addition to the above, a series of dating wheels indicated at 82, is likewise loosely carried by the shaft 72, as is also a wheel 83 provided with dollar marks. Further, there is mounted on the same shaft a sleeve 84 having fixed to it a pinion 85 engaged by a rack 86 carried by or forming part of the upper end of the rod $23^a$. This sleeve 84 has fixed to it a wheel 87 carrying a number of symbols or sets of designating numbers 88; the number of these symbols or sets of numbers corresponding to the number of drawers mounted in the casing 1. In the present case there are three sets of numbers and the arrangement is such that the movement of the rod $23^a$ caused by the opening of one of the drawers, as described in our application for patent heretofore referred to, causes the corresponding symbol or designating figures to be brought into its lowermost or printing position.

It is noted that the rod $23^a$ is specially formed, having a projecting locking portion or tooth 89, as shown in Figs. 2, and 6, which is intended to coöperate with a tooth 90 fixed to the shaft 47 to prevent this latter being turned by the operating handle 48 in an operative direction unless the rod $23^a$ has been sufficiently raised, as by opening of one of the drawers, to free this toothed part 89 from the tooth formed by the part 90. It is understood that the springs 11 ordinarily furnish the power for opening the drawers and moving upwardly the rod $23^a$.

The top of the casing 5 is for the most part in the form of a flat, smooth table indicated at 37, and the casing 68 is spaced away from the rear portion of this casing to permit of the passage between it and said part 37 of the two thicknesses of paper web indicated at $x'$ and $x^2$. As fully shown in our application heretofore referred to, on opposite sides of the casing 5, adjacent the side edges of the table portion 37 thereof, are mounted rollers $5^b$ for the support of an ink ribbon or carbon sheet 91 (Fig. 7) which extends across said table between these two webs of paper, but inasmuch as this feature in itself forms no part of the present invention, it has not been considered necessary to show it in detail.

As clearly shown, the rear portion of the table 37 is cut or slotted immediately under the casing 68 to permit of the passage of the platen 66 and also to allow the paper web $x^2$ to pass to the receiving roller 92 which is journaled on a spindle 93 removably carried in bearings in the sides of the casing 5. This roller is provided with a pulley 94 and is operatively connected, by a belt formed of an endless spiral spring 95, with a second pulley 96 fixed to the main operating shaft 47; the arrangement being such that said belt may slip on these pulleys without causing breakage of the web $x^2$ at such times as said web is not free to be fed onto the roller 92. On the rear portion of the casing 68 is mounted a relatively sharp tearing edge 97. The carriage 24 is removably held within the casing 5 and is at the same time fixedly maintained in a definite position by reason of its being provided with a key hole slot 98 which receives a pin or screw 99 preferably mounted in the front inner floor of the said casing 5 adjacent the end $5^a$ thereof, which is hinged at its lower edge so as to be free to swing down to permit removal of the carriage.

Under conditions of use a double web of paper is mounted on the roller 27 and its two parts are led therefrom parallel with each other over the rollers 33, 34, and 35, from the last of which they pass through the slot 36, longitudinally over the table 37 and under the casing 68. In placing said webs over the table, the inking ribbon 91 from the roller $5^b$ is passed transversely between them, after which the web $x^2$ is led mid the run 102 of the printing wheel ribbon and the web $x'$ is passed between the two runs 101 and 102 of said ribbon, which may be supported and fed in any suitable manner. Both webs are then led between the nip rolls 62 and 67 and the web $x^2$ is passed through the opening in the table to the roller 92. The web $x'$ is led out through an appropriate opening in the rear of the casing 68 and between the upwardly curved rear part $5^c$ of the casing 5 and the tearing edge 97. It may be noted that this part $5^c$ is hinged to the rear edge of the table 59 and may be swung upwardly so as to permit of the removal of the roll 92 with the paper carried thereby. In further preparing the machine for use, the handle 48 is given two or more preliminary revolutions, it being necessary, however, that one of the drawers first be opened in order that the rod $23^a$ may have been moved upwardly to a distance sufficient to cause the tooth 89 to clear the ratchet tooth 90 on the shaft 47. Such revolution of the said shaft, through the gear wheels 55 and 56, at once causes a revolution of the shaft 38 and of the printing roller carried thereby, in the direction of the arrow in Fig. 2. The type or printing means carried by the curved shell 40 on said roller is thus first brought into engagement with the inking roller 32 and is thereafter caused to make an impression on the outer of the paper webs $x'$ passing from the supply roll X; it being noted that the web is drawn off of said roll and kept taut by reason of the revolution of the shaft 93 from the pulley 96, belt 95 and pulley 94. Thus after two revolutions of the main shaft 47, a schedule such as that shown in Fig. 5 is presented to the operator upon the upper surface of the paper web $x'$ on the table 37, the various parts of the machine being so proportioned that the part $y'$ of the schedule $y$ lies immediately under the printing faces of the various printing wheels mounted on the shaft 72. If now it is desired to use the machine to make a record of a sale, the salesperson writes in the space $y^2$ the name of the article purchased, putting in the proper places on the schedule the various other pieces of information required and this autographic record is transferred to the under web $x^2$ by reason of the carbon sheet or ink ribbon delivered from the rollers $5^b$. It is understood that each of the drawers 2, 3 and 4 is provided with a lock and that each of these locks requires a different key kept by the saleperson who is held responsible for the money placed in the corresponding drawer. If, for example, the salesperson on duty unlocks the drawer 2, this is at once opened by the action of its spring 11 and through the various parts shown in Fig. 1, the rod $23^a$ is moved upwardly, thus freeing the ratchet tooth 90 from the tooth 89 on said shaft, and likewise moving one of the designating symbols 88 into printing position by reason of the action of the rack 86 on the pinion 85 and the sleeve 84. Thereafter the various arms 74 are moved into positions adjacent certain symbols on the outside of the top face of the casing 68 corresponding to the amount of the sale made and through the gear wheels 73 and the coöperating gear wheels upon the shaft 72, the number wheels attached to said gear wheels are moved to bring into printing position certain numbers corresponding to the amount of the sale. The handle 48 is then given one complete revolution in the direction of the arrow Fig. 1, as a result of which the platen 66 is at once moved up so as to force the two paper webs against the lowermost numbers or symbols of the various printing wheels carried by the shaft 72. As a consequence duplicate records of the amount of a sale, salesperson's number or symbol, the date and the number of the sale, are all printed on the two webs of paper, which are held from moving, even though the roller 92 should tend to turn under the action of its belt and pulleys, by reason of the fact that the spring $105^a$ holds the arm 106 in such a position that its tooth 107 engages and fixedly holds the pinion 63. Shortly after the high parts of the cams 52 have disengaged the rollers on the ends of the arms 54, the cam 53 strikes the arm 108, thereby so moving the arm 106 as to withdraw the tooth 107 from engagement with the gear 63. Thereafter the teeth on the interrupted gear 51 come into engagement with this gear 63 and so turn the nip rolls as to permit the roll 92 to wind up the paper web $x^2$ and feed the paper web $x'$ out of the back of the machine.

The curved plate 40 carrying the printed matter on the roll 39 begins to engage the outer of the paper webs as these begin to feed from the supply roll X, so that as the paper is pulled through the machine by the nip rolls and wound up, another schedule is printed by the action of the roll 39; it being noted that this newly printed schedule lies wholly within the casing 5 so that the ink is given time to dry before the paper web is delivered onto the table 37. The revolution of the roller 39 successively brings the ends of the two cranks 44 into engagement with the cam strips 45 and 46 so that the numbering wheels 42 carried by this roller are actuated and when next they engage the paper web they print thereon the numbers indicated at $y^3$ and $y^4$, thus numbering the schedules consecutively, and in two places. The moving up of the arms 64 causes the pawl 80 to likewise actuate the numbering wheels 81 so that at the time a record of a sale is made as indicated at $y^6$ on the schedule, a third impression of the number of a sale is made as indicated at $y^5$; it being understood that the schedule as a whole is torn into two or more sections at the time of or after its delivery from the machine in order that one section may be given as a receipt to the customer, another section bearing the customer's address and other information is attached to the goods, a third is placed in the package, while another portion may be retained by the salesperson, depending upon the system in use. The various arms 74 may now be returned to their normal positions and after the proper change has been made, or the money received from the customer deposited in the drawer 2, the latter may be moved to its closed position and locked, thus again bringing the tooth 89 into engagement with the tooth 90 on the shaft 47; the tooth 107 on the arm 106 having been previously brought into engagement with the gear 63 so as to hold the nip rolls from moving and consequently prevent feeding of the web through the machine.

We claim:—

1. The combination in a cash register of means for supporting a web of blank paper; means for printing a blank schedule thereon; independent mechanism for printing a record on the previously printed schedule; and a table between the schedule printing means and said record printing mechanism, for supporting the web of paper to permit of the making of an autographic record thereon; with means for guiding the blank paper web from its supporting means to the schedule printing means and from thence to the supporting table and the record printing mechanism.

2. The combination in a cash register of means for supporting a double web of blank paper; means for printing a schedule on one only of the webs of paper as it passes from the supporting means; a structure for supporting said webs of paper to permit of an autographic record being made on one of them; means for causing the autographic record to be duplicated on the unprinted web; and means for simultaneously forming a record on both webs of paper; with devices for successively guiding said paper webs from the supporting means to the schedule printing means, the supporting structure and the record-forming means.

3. The combination in a cash register of a casing; means for supporting a double web of blank paper in the form of a roll within the body of said casing; means for printing a schedule on one only of the webs of paper as it passes from the supporting means, the top of said casing forming a table for supporting said webs of paper and permitting an autographic record being made on one of them; means for causing said latter record to be duplicated on the unprinted web; means within the rear part of the casing for forming a record on one of the webs of paper; and means for guiding the paper webs from the supporting means adjacent the schedule printing means, thence over the top of the casing to the record forming means and to a receiving roll.

4. The combination in a cash register of a structure for supporting a web of blank paper; printing mechanism carried by said structure for forming a succession of schedules on said web; a casing inclosing said mechanism; and means carried by the casing for printing a record or records on the schedules previously formed on said web of paper; said casing being formed to support the web of paper to permit of the making of an autographic record thereon, and the structure carrying the paper web and the schedule printing mechanism being removable from said casing.

5. The combination of a casing having its top in the form of a web supporting table; a carriage removably mounted in the casing; schedule printing mechanism mounted on the carriage, means for supporting a web of blank paper on the carriage; record printing means mounted on the casing in position to receive the paper web after a schedule has been printed thereon; and operating means carried by the casing for actuating both of said sets of printing mechanism.

6. The combination of a casing having its top in the form of a web supporting table; a carriage removably mounted in the casing; schedule printing mechanism mounted on the carriage, means for supporting a web of blank paper on the carriage; record printing means mounted on the casing in position to receive the paper web after a schedule has been printed thereon; and operating means carried by the casing for actuating both of said sets of printing mechanism; said actuating means being detachably connected to the schedule printing mechanism on the carriage.

7. The combination of a casing having its top in the form of a web supporting table; a carriage removably mounted in the casing; schedule printing mechanism mounted on the carriage; means for supporting a web of blank paper on the carriage; record printing means placed to receive the paper web after a schedule has been printed thereon; and operating means carried by the casing for actuating both of said sets of printing mechanism; said actuating means being detachably connected to the schedule printing mechanism on the carriage; with means for locking the said printing mechanism when it is desired to remove the carriage.

8. The combination in a cash register of means for supporting a blank paper web; schedule printing means; adjustable record printing mechanism mounted to receive the web after the schedule has been printed thereon; operating means for said two sets of printing mechanism; and means for locking the record printing mechanism until after the schedule printing mechanism has been operated to a predetermined extent.

9. The combination in a cash register of means for supporting a web of blank paper; means for printing a schedule on said web; means for thereafter printing a record on the web; with a common operating device for said two sets of mechanism, the same including means for continuously exerting tension upon the paper web during the operation of the machine; and means for preventing movement of the web at one part of such operation.

In testimony whereof, we have signed our names to this specification, in the presence of two subscribing witnesses.

STEPHEN B. TILY.
JOHN G. REHFUSS.
MARTIN O. REHFUSS.

Witnesses:
WILLIAM E. BRADLEY,
WM. A. BARR.